United States Patent Office 3,164,516
Patented Jan. 5, 1965

3,164,516
INSECTICIDAL COMPOSITIONS CONTAINING LIGNIN SULFONIC ACID
Robert J. Geary, Vero Beach, Fla., assignor to Plant Products Corporation, Blue Point, N.Y., a corporation of New York
No Drawing. Filed Apr. 7, 1960, Ser. No. 20,558
4 Claims. (Cl. 167—42)

This invention relates to insecticidal compositions, and more particularly to insecticidal compositions in the form of a dried powder which is suitable for application either as a dust or in spray form.

A great many insecticidal materials have been prepared in the past and these preparations have been available in different physical forms, such as solids, mixtures, pastes, liquids and the like. In general the effectiveness of these preparations depends upon many factors. Thus, although it is generally preferable for reasons of economy and to avoid damage to the plant material and other objects being sprayed, that the insecticidal composition be applied in aqueous solution or suspension form, the sprayings which are thus applied must be of such a nature as to adhere to the object being sprayed. Further, this adherence should not be for so short a duration as to minimize the activity of the insecticidal material. It should, in other words, be reasonably resistant for extended periods of time to weathering conditions such as rain, and the like, in addition to sunlight, carbon dioxide and the other exudates of the plants, rubbing of the parts of the plants together and the like. In view of the substantially water insoluble property of most of the present day organic insecticidal materials, it has been usually found necessary to prepare these compositions in the field in dilute form before spraying. The insecticidal compositions are usually marketed in more or less concentrated form, although they almost always contain large amounts of diluents of a solid form which may at the same time serve as adsorbents, dispersing agents and the like. Some of these diluents may also serve as sticking agents, as for example the various caseins, albumens, glues and the like. To promote their ready dispersion in water at the time of application, these compositions usually contain small amounts of wetting or dispersing agents added to them for that purpose.

Of late, the use of concentrated spray mixtures has found increasing use. In this method, the spray is applied by means of large volumes of air admixed with small volumes of liquid insecticidal compositions. This is of course a very economical method of spraying, but requires the use of highly concentrated insecticidal aqueous solutions or dispersions, in addition to, of course, the ability to be finely atomized during application. The usual compositions containing large quantities of inert material are, of course, unsuitable for this method of application. On the other hand, many agriculturists prefer to employ a spray for treating certain plants and produce, and a dust for others. It would accordingly be obviously desirable for them to be able to keep only one composition on hand which could be employed either as a dust or as a spray. Many insecticidal materials are difficult to produce in dry powder form for various reasons. For example, they may be normally liquid, or if solid, they may not be amenable to grinding in the usual manner. Powders containing them may tend to agglomerate, or increase in crystal size, or sublime by virtue of high vapor pressures or the like.

It is an object of this invention to provide an improved insecticidal composition in the form of a powder. It is another object of this invention to provide an improved insecticidal powder which is readily soluble or dispersible in water to produce a concentrated spray composition. It is another object of this invention to provide an improved insecticidal composition which, when applied to the object being protected, or combatted adheres thereto for extended lengths of time without losing effectiveness. Other objects and advantages will appear as the description proceeds.

The attainment of the above objects is made possible by the instant invention which is based upon the provision of a solid insecticidal composition consisting essentially of about 35 to 85%, preferably 50 to 75%, of a readily water dispersible, preferably water-soluble, lignin sulfonic acid, 65 to 15%, preferably 50 to 25%, of an organic insecticide containing at least about 52%, preferably at least 55%, chlorine and 0 to 2% of another surface active agent.

The use of readily water dispersible lignin sulfonic acids in insecticidal compositions has of course been known for a long time. However, its use has been largely restricted to small proportions of the composition in comparison with the organic insecticidal materials and inert diluents therein, functioning in the main as a wetting or dispersing agent. The effectiveness of the instant compositions containing such large proportions of lignin sulfonic acids as 35 to 85% is surprising when it is remembered that the use of large amounts of surface active agents is known to be disadvantageous in reducing adherence to the material being protected or combatted because of their ready wettability and solubility in rain, dew, and the like. The instant compositions have been found not only to enable the production of highly concentrated spray compositions, but the coatings produced therefrom are highly adherent to the material being sprayed. Further, the effectiveness of the coating against the pest is in many cases greatly prolonged. The dried powders of this invention, while in storage, have been found to resist agglomeration and caking. Thus, insecticides which have in their usual dust formulations the undesirable characteristic of re-agglomerating and forming larger masses, may be employed in the compositions of the instant invention to produce free flowing powders which disperse readily in water to a very fine subdivision equal to the original grind. Insecticides which are sensitive to pH variations can be formulated directly with calcium lignin sulfonate or other similar soluble or dispersible lignin sulfonic acids to form dispersions in water which after spraying are greatly resistant to decomposition by sunlight, plant gases and exudates. Coatings produced from the compositions of this invention are also non-toxic to plants.

The water dispersible lignin sulfonic acids, including their salts, useful in the instant invention are for the most part well known in the art. The usual salts are those of the alkali metals, alkaline earth metals, ammonia and amines, for example sodium, potassium, calcium, magnesium, ammonium and substituted ammonium salts derived from primary, secondary and tertiary amines, such as methylamine, diethylamine, dimethylamine, trimethylamine, triethylamine, diethanolamine, ethanolamine, triethanolamine, isopropanolamine, ethylene diamine, diethylene triamine, cyclohexylamine, pyridine, morpholine and the like. The lignin residue may be unsubstituted or it may contain substituents known in the art. Thus, the lignin sulfonic acids may contain chlorine or nitro substituents in amounts ranging from about 3 to 22% or more. They may have been esterified with low or high molecular weight aliphatic or alicyclic acids such as acetic, butyric, oleic, stearic, abietic, tall oil acids and the like. They may have been esterified with aromatic acids also, as for example with benzoyl chloride. The lignin residue may have been alkylated with alkylating agents such as aliphatic and aromatic chlorides, for example, benzyl chloride, ethylene chloride, allyl chloride and the like. The lignin may have been reacted with a phenol or an aldehyde or any combination thereof. It may have been reacted with mono- or polyhydric alcohols to produce the corresponding ethers. It will be seen, therefore, that any readily water dispersible lignin sulfonic acid is operative herein, the common characteristic being the presence of a solubilizing sulfonic acid or sufonic acid salt group in the molecule. The molecule may, in fact, contain more than one sulfonic group therein. In general, they range from neutral to acid in their reaction. They may therefore be employed with any insecticide which is stable at neutral or acid pHs.

The insecticides employed in the instant compositions should be organic in nature, and stable at neutral or acid pHs. The compositions of the instant invention show their greatest advantage, of course, with those organic insecticides which are sparingly soluble in water, and are therefore otherwise difficult to reduce to stable aqueous solution or suspension form for spraying. Mixtures of these organic insecticides may, of course, be employed provided that their total amount falls within the proportions specified above in the production of the compositions of the instant invention.

The formulations in the examples below have been found particularly effective in carrying out the instant invention, but it will be understood that they are merely illustrative. In those formulations wherein the components are sold in their natural state, they should first be thoroughly mixed as for example by passage through common mixing or blending devices, such as ribbon blenders, ball mills and various types of grinding equipment. The intimate mixture of lignin sulfonic acid and insecticide is then subjected to attrition in order to provide a powder of the type suitable for subsequent use in spray compositions or the like. This attrition, which if desired is capable of producing average particle sizes of about 5 microns or less, may be suitably obtained by use of the fluid energy type grinding means known as air attrition mills or jet pulverizers. In such pulverizing devices, the mixture of lignin sulfonic acid and insecticide is suspended and buffeted in a high velocity gas stream, whereby there occurs the required attrition or abrasion of the particles on each other and on the walls of the pulverizing equipment. Air attrition mills which are suitable for use in preparing these formulations are described in, for example, U.S. Patent Nos. 2,032,827, 2,219,011 and 2,284,746.

Where the insecticide is a liquid, it is preferred to add a wetting or dispersing agent thereto first, and then spray the resulting liquid mixture or solution upon the lignin sulfonic acid particles while the latter are being agitated in the mixing or blending device. Only a small proportion of wetting or dispersing agent is in this case required, as for example from about ¼ to 2% based upon the weight of the insecticide. The mixture thus obtained contains insecticide distribution uniformly over and throughout the particles of lignin sulfonic acid, this mixing being facilitated by the wetting or dispersing agent, and therefore a subsequent mixing or grinding operation in an attrition mill is not necessary but only a matter of choice depending upon the desired results. The wetting or dispersing agents useful in the latter case are usually of the anionic type or the nonionic type. The anionic surface active agents are typified by the various higher molecular weight sulfates such as alkylaryl sulfonates, naphthalene formaldehyde sulfonates, N-higher acyl taurines, sulfates of polyoxyethylenated compounds, fatty alcohol sulfates, sulfonated fatty acids, etc. The nonionic surface active agents are typified by the condensation products of a plurality of moles of ethylene oxide with higher aliphatic alcohols, alkyl phenols, amines, amides, fatty acids, and other higher molecular weight compounds containing at least 10 carbon atoms and a reactive hydrogen atom, as disclosed in U.S. 1,970,578 and other patents. It will be understood that these agents may also be included in the formulations of the previous paragraph.

The calcium lignin sulfonate referred to in the examples in the following table contains one or two sulfonic groups, has a molecular weight of approximately 1000, a pH of about 4.6, and is 94% moisture free. All the formulations described in the examples have been found to be particularly effective. However, as stated above, they are given for illustrative purposes and are not to be regarded as limiting the instant invention. All parts and proportions referred to herein and in the appended claims are by weight unless otherwise indicated.

Table

| Example | Calcium Lignin Sulfonate, percent | Insecticide±Surface Active Agent |
| --- | --- | --- |
| 1 | 50 | 50% Dieldrin (1,2,3,4,10,10-hexachloro-6,7-epoxy-1,4,4a,5,6,7,8,8a-octahydro-1,4-endo, exo-5,8-dimethanonaphthalene). |
| 2 | 49½ | 50% Dieldrin; ½% Triton X-100 (isooctyl phenol decaethylene glycol ether). |
| 3 | 50 | 50% Lindane (gamma isomer of 1,2,3,4,5,6,-hexachloro-cyclohexane). |
| 4 | 49½ | 50% Lindane; ½% Gardinol (sodium dodecyl sulfate). |
| 5 | 74½ | 25% Endrin (endo,endo isomer of Dieldrin). |
| 6 | 50 | 50% Heptachlor (1,4,5,6,7,8,8-heptachloro-3a,4,7,7a,tetrahydo-4,7-endomethanoindene). |
| 7 | 75 | 25% Dieldrin. |
| 8 | 74½ | 25% Toxaphene (chlorinated camphene, 67-69% Cl); ½% Triton X-100. |
| 9 | 50 | 50% Thiodan (alpha,beta-1,2,3,4,7,7-hexachlorobicyclo-[2.2.1]-2-heptene-5,6-bisoxymethylene sulfite). |

Other insecticides which may be employed in formulations of the above type and in accordance with the basic principles of this invention include Chlordan (1,2,4,5,6,7,8,8-octachloro-2,3,3a,4,7,7a-hexahydro-4,7-methanoindene), Aldrin (1,2,3,4,10,10-hexachloro-1,4,4a,5,8,8a-hexahydro-1,4-endo,exo - 5,8 - dimethanonaphthalene), Isodrin (endo, endo isomer of Aldrin), and the like. It will be noted that these insecticides containing at least about 52%, preferably at least 55%, chlorine all contain at least one cyclic structure and at least 6 chlorine atoms. For example, DDT which contains about 50% chlorine (and 5 chlorine atoms) has been found surprisingly inferior when substituted for the above defined insecticides in the compositions of this invention.

This application is a continuation-in-part of my application Serial No. 515,213, filed on June 13, 1955, now abandoned.

This invention has been disclosed with respect to certain preferred embodiments and various modifications and variations thereof will become obvious to the person skilled in the art. It is to be understood that such modifications and variations are to be included within the spirit and scope of this invention.

I claim:

1. An insecticidal composition in particulate form consisting essentially of about 50 to 75% of a water dispersible lignin sulfonic acid, and 50 to 25% of 1,2,3,4,10,10-hexachloro-6,7-epoxy - 1,4,4a,5,6,7,8,8a - octahydro-1,4-endo,exo-5,8-dimethanonaphthalene.

2. An insecticidal composition in particulate form consisting essentially of about 50 to 75% of a water dispersible lignin sulfonic acid, and 50 to 25% of 1,2,3,4,10,10-hexachloro - 6,7 - epoxy - 1,4,4a,5,6,7,8,8a - octahydro-1,4-endo-endo-5,8-dimethanonaphthalene.

3. An insecticidal composition in particulate form consisting essentially of about 50 to 75% of a water dispersible lignin sulfonic acid, and 50 to 25% of chlorinated camphene containing about 67 to 69% chlorine.

4. An insecticidal composition in particulate form consisting essentially of about 50 to 75% of a water dispersible lignin sulfonic acid, and 50 to 25% of alpha,beta-1,2,3,4,7,7 - hexachlorobicyclo - [2.2.1] - 2 - heptene-5,6-bisoxymethylene sulfite.

References Cited in the file of this patent
UNITED STATES PATENTS

| | | |
|---|---|---|
| 2,858,250 | Geary | Oct. 28, 1958 |
| 2,893,913 | Wiedow | July 7, 1959 |